United States Patent
Kawai et al.

(10) Patent No.: US 9,812,914 B2
(45) Date of Patent: Nov. 7, 2017

(54) ROTOR COMPONENT MEMBER, ROTATING AXIS, ROTOR, MOTOR, AND MACHINE TOOL

(71) Applicant: FANUC CORPORATION, Yamanashi (JP)

(72) Inventors: Kenji Kawai, Yamanashi (JP); Shinobu Takano, Yamanashi (JP); Yohei Arimatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/939,377

(22) Filed: Nov. 12, 2015

(65) Prior Publication Data

US 2016/0141931 A1    May 19, 2016

(30) Foreign Application Priority Data

Nov. 19, 2014   (JP) .................................. 2014-234734

(51) Int. Cl.
  *H02K 1/27*    (2006.01)
  *H02K 1/30*    (2006.01)
  *H02K 15/03*   (2006.01)

(52) U.S. Cl.
  CPC ............... *H02K 1/30* (2013.01); *H02K 1/278* (2013.01); *H02K 15/03* (2013.01)

(58) Field of Classification Search
  CPC .. H02K 1/28; H02K 1/30; H02K 1/32; H02K 1/27–1/2793

(Continued)

(56) References Cited

U.S. PATENT DOCUMENTS

2003/0201683 A1* 10/2003 Chen .................... F16C 33/107
                                                310/90
2008/0211329 A1    9/2008 Bauer
(Continued)

FOREIGN PATENT DOCUMENTS

DE           1151158 A     7/1963
DE     102012011913 A1    12/2012
(Continued)

OTHER PUBLICATIONS

Machine Translation, Owaki et al., JP 2011129857 A, Jun. 30, 2011.*

(Continued)

*Primary Examiner* — Thomas Truong
(74) *Attorney, Agent, or Firm* — Fredrikson & Byron, P.A.

(57) ABSTRACT

A rotor according to the present invention includes a rotating axis rotating about an axial center of the rotating axis and a rotor component member including an inner circumferential surface on which an outer circumferential surface of the rotating axis fits. The outer circumferential surface of the rotating axis and the inner circumferential surface of the rotor component member include corresponding tapered surfaces each having a diameter that varies in taper along the axial center, the tapered surfaces being in full contact with each other while the outer circumferential surface of the rotating axis is press-fitted relative to the inner circumferential surface of the rotor component member, and at least one of the tapered surfaces has a corrugated surface structure storing a lubricant before the rotating axis is press-fitted relative to the rotor component member, while configured to wear away by press-fitting the rotating axis relative to the rotor component member to discharge the lubricant.

10 Claims, 11 Drawing Sheets

(58) Field of Classification Search
USPC .................................. 310/216.119, 216.121
IPC .............................. H02K 1/27,1/28, 1/30, 1/32
See application file for complete search history.

(56) References Cited

U.S. PATENT DOCUMENTS

| | | | | |
|---|---|---|---|---|
| 2009/0046960 | A1* | 2/2009 | Hibi | F16C 17/02 384/107 |
| 2012/0326555 | A1* | 12/2012 | Arimatsu | H02K 1/30 310/216.121 |

FOREIGN PATENT DOCUMENTS

| | | | | |
|---|---|---|---|---|
| JP | 11089142 | A | | 3/1999 |
| JP | H11099403 | A | | 4/1999 |
| JP | 2002078303 | A | | 3/2002 |
| JP | 2009270700 | A | | 11/2009 |
| JP | 2011129857 | A | * | 6/2011 |
| JP | 2013009528 | A | | 1/2013 |
| WO | 2013038913 | A1 | | 3/2013 |

OTHER PUBLICATIONS

Untranslated Notification of Reasons for Refusal mailed by JPO, dated Dec. 8, 2015, 5 pages.
English machine translation of Notification of Reasons for Refusal mailed by JPO, dated Dec. 8, 2015, 4 pages.
Untranslated Notification of Reasons for Refusal mailed by JPO, dated Feb. 23, 2016, 5 pages.
English machine translation of Notification of Reasons for Refusal mailed by JPO, dated Feb. 23, 2016, 5 pages.
Untranslated Notification of Reasons for Refusal mailed by JPO, dated May 10, 2016, 3 pages.
English machine translation of Notification of Reasons for Refusal mailed by JPO, dated May 10, 2016, 3 pages.
Untranslated Decision to Grant a Patent mailed by JPO, dated Jun. 7, 2016, 3 pages.
English machine translation of Decision to Grant a Patent mailed by JPO, dated Jun. 7, 2016, 3 pages.
English Abstract and Machine Translation for Japanese Publication No. 11-089142 A, published Mar. 30, 1999, 12 pgs.
English Abstract and Machine Translation for Japanese Publication No. 2013-009528 A, published Jan. 10, 2013, 19 pgs.
English translation of Abstract for WO2013/038913, Date of Publication: Mar. 21, 2013, 1 page.
English translation for Japanese Publication No. 2002078303, Date of Publication: Mar. 15, 2002, 7 pages.
English Translation of Japanese Publication No. 2009270700, published Nov. 19, 2009, 7 pages.
English Translation of Japanese Publication No. H11099403, published Apr. 13, 1999, 7 pages.
English Abstract and Machine Translation for German Publication No. 10 2012 011 913 A1, published Dec. 27, 2012,15 pgs.
English Machine Translation for German Publication No. 1 151 158 A, published Jul. 4, 1963, 6 pgs.

* cited by examiner

FRONT ← → REAR

ROTOR COMPONENT MEMBER, ROTATING AXIS, ROTOR, MOTOR, AND MACHINE TOOL

BACKGROUND OF THE INVENTION

1. Field of the Invention

The present invention relates to a rotor component member, a rotating axis, and a rotor for a motor using a tapered sleeve, and a motor including the rotor, and a machine tool including the motor.

2. Description of the Related Art

In a rotor for a motor including a rotating axis and a sleeve mounted on an outer circumferential surface of the rotating axis, the sleeve is to be firmly fixed to the rotating axis such that a position of the sleeve relative to the rotating axis is not deviated during rotation of the rotor. In this regard, the rotor in which an inner circumferential surface of the sleeve is fitted on the outer circumferential surface of the rotating axis by interference fit so that the rotating axis and the sleeve are integrated with each other is known (for example, see Japanese Laid-open Patent Application No. 2013-9528 and Japanese Laid-open Patent Application No. H11-89142).

In Japanese Laid-open Patent Application No. 2013-9528, the outer circumferential surface of the rotating axis and the inner circumferential surface of the sleeve are each formed into a tapered shape. When the sleeve is mounted on the rotating axis, a lubricant is applied to the outer circumferential surface of the rotating axis, and the rotating axis is press-fitted along the inner circumferential surface of the sleeve. On the other hand, in Japanese Laid-open Patent Application No. H11-89142, an oil passage is formed in the sleeve, and high-pressure oil is introduced through the oil passage to a portion facing the inner circumferential surface of the sleeve. Due to hydraulic pressure caused by the high-pressure oil, an inner diameter of the sleeve is temporarily enlarged and the sleeve is fitted on the rotating axis.

However, in the rotor disclosed in Japanese Laid-open Patent Application No. 2013-9528 as described above, the lubricant is present on fitting surfaces of the rotating axis and the sleeve so that a friction force between the rotating axis and the sleeve reduces, and a position of the sleeve relative to the rotating axis may be deviated during high-speed rotation. Moreover, in the rotor disclosed in Japanese Laid-open Patent Application No. H11-89142 as described above, in order to supply hydraulic pressure to the inner circumferential surface of the sleeve, a hydraulic device is separately to be provided, and therefore manufacturing costs increase. Further, forming the oil passage in the sleeve causes the strength of the sleeve to be lowered.

SUMMARY OF THE INVENTION

An embodiment of the present invention relates to a rotor component member fitted on a rotating axis rotating about an axial center of the rotating axis, the rotor component member including: a sleeve including an inner circumferential surface press-fitted relative to an outer circumferential surface of the rotating axis; and a rotor component mounted on an outer circumferential surface of the sleeve. The inner circumferential surface of the sleeve includes a tapered surface having a diameter that varies in taper along the axial center, and the tapered surface has a corrugated surface structure storing a lubricant and configured to wear away by press-fitting the rotor component member relative to the rotating axis.

Another embodiment of the present invention relates to a rotating axis rotating about an axial center of the rotating axis, including: an outer circumferential surface press-fitted relative to an inner circumferential surface of a cylindrical rotor component member, in which the outer circumferential surface includes a tapered surface having a diameter that varies in taper along the axial center, and the tapered surface has a corrugated surface structure storing a lubricant and configured to wear away by press-fitting the rotating axis relative to the rotor component member.

Still another embodiment of the present invention relates to a rotor including: a rotating axis rotating about an axial center of the rotating axis; and a rotor component member including an inner circumferential surface on which an outer circumferential surface of the rotating axis fits. The outer circumferential surface of the rotating axis and the inner circumferential surface of the rotor component member include corresponding tapered surfaces each having a diameter that varies in taper along the axial center, the tapered surfaces being in full contact with each other while the outer circumferential surface of the rotating axis is press-fitted relative to the inner circumferential surface of the rotor component member, and at least one of the tapered surface of the rotating axis and the tapered surface of the rotor component member has a corrugated surface structure storing a lubricant before the rotating axis is press-fitted relative to the rotor component member, while configured to wear away by press-fitting the rotating axis relative to the rotor component member to discharge the lubricant.

Still another embodiment of the present invention relates to a motor including the above rotor.

Still another embodiment of the present invention relates to a machine tool including the above motor.

DETAILED DESCRIPTION

Figure 1:
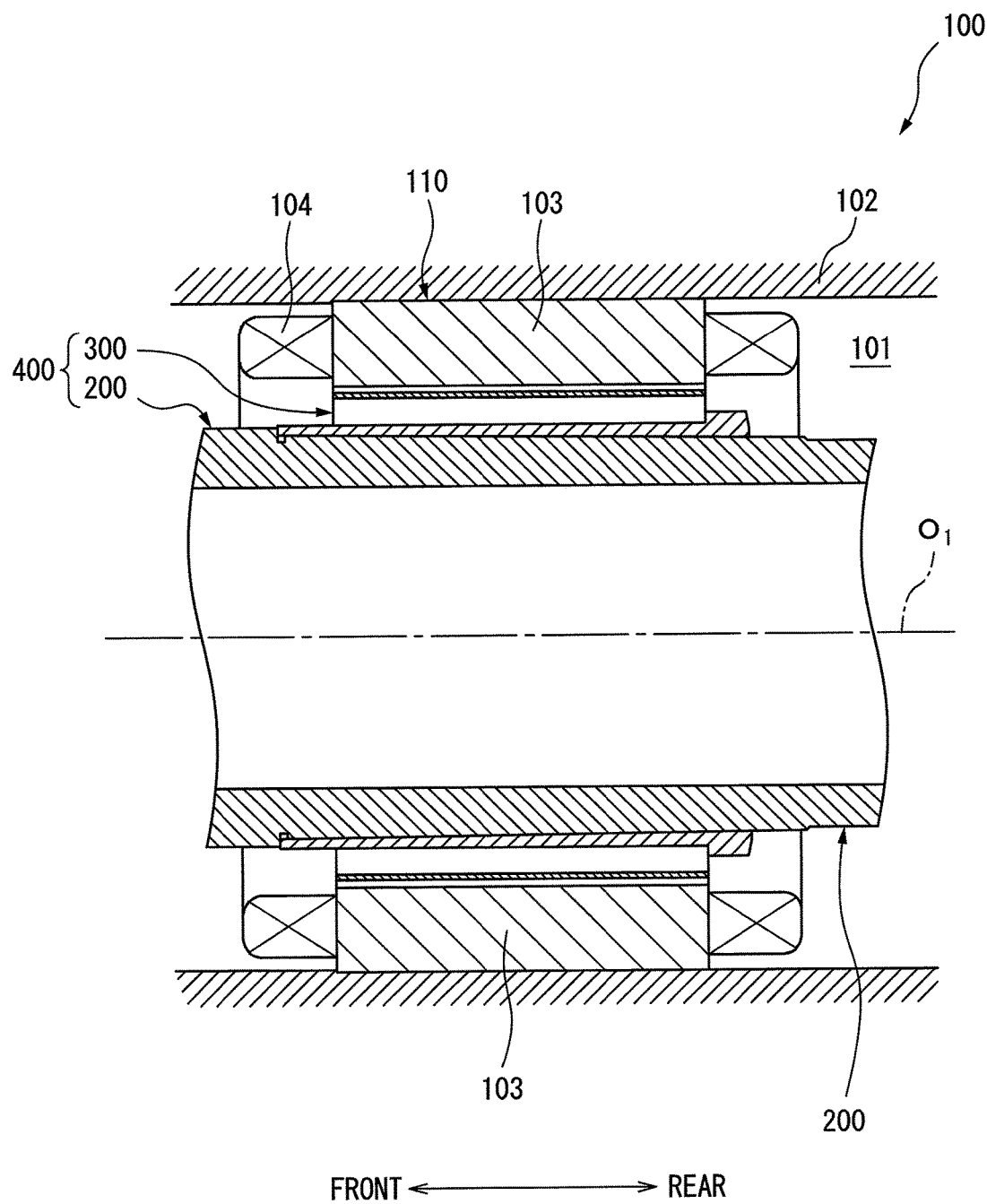
FIG. 1 is a cross-sectional view of a motor according to an embodiment of the present invention.

Embodiments of the present invention will be hereinafter described with reference to FIGS. 1-13. First, a configuration of a motor according to the embodiments of the present invention will be described. FIG. 1 is a cross-sectional view of a motor 100 according to an embodiment of the present invention. Hereinafter, a direction along an axial center $O_1$ of a rotating axis of the motor 100 is defined as an axial direction, a direction along a circumferential surface of a circle around the axial center $O_1$ is defined as a circumferential direction, and a direction radially extending from the axial center $O_1$ is defined as a radial direction. Moreover, as illustrated in the drawings, one side and the other side of the motor 100 are defined as axially frontward and axially rearward, respectively. Note that axially frontward and axially rearward are appropriately determined in view of facilitating the understanding and do not indicate a particular direction, such as frontward or rearward of the motor, in a limitative manner.

Figure 13:
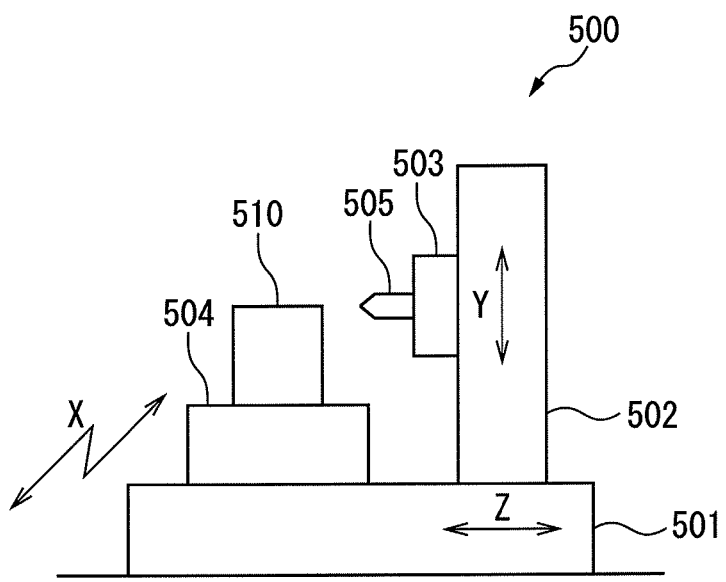
FIG. 13 is a diagram illustrating a schematic configuration of a machine tool to which the motor according to embodiments of the present invention is applied.

FIG. 13 is a diagram illustrating an example of a machine tool to which the motor 100 according to the embodiments of the present invention is applied. As illustrated in FIG. 13, the machine tool 500 is, for example, a horizontal type machining center and includes a base 501, a column 502 standing on the base 501, a main shaft 503 provided on the column 502, and a table 504 on which a workpiece 510 is placed, in which a tool 505 is mounted on the main shaft 503. Note that, in FIG. 13, a horizontal direction which is parallel to a rotating axis of the main shaft 503 is defined as z-axis, a vertical direction of the rotating axis is defined as y-axis, and a horizontal direction which is orthogonal to both z-axis and y-axis is defined as x-axis, and an x-axis direction, a y-axis direction, and a z-axis direction are each indicated by an arrow.

The main shaft 503 is moved in the y-axis direction by a drive by a y-axis motor by means of a feed screw, and is moved integrally with the column 502 in the z-axis direction by a drive by a z-axis motor by means of a feed screw. The table 504 is moved in the x-axis direction by a drive by an x-axis motor by means of a feed screw. The motor 100 according to this embodiment is a built-in motor used for driving the main shaft 503 of the machine tool 500. An objective of the built-in motor is to be directly mounted in an object to be rotated, namely the main shaft 503, and directly drive the main shaft 503. The motor for driving the main shaft of the machine tool 500 is configured to be a built-in motor as described above so that processing accuracy of the main shaft 503 can be enhanced.

As illustrated in FIG. 1, the motor 100 includes a housing 102 which delimits an interior space 101, a stator 110 which is statically disposed in the interior space 101 of the housing 102, and a rotor 400 rotatably provided at a radially inner side of the stator 110. A plurality of magnets 311 (see FIG. 6) are mounted on a surface of the rotor 400, and the motor 100 is a surface magnet type motor (surface permanent magnet (SPM) type motor). The stator 110 includes a stator core 103 and a coil 104 wound around the stator core 103. For example, thin plates which are electromagnetic steel sheets are laminated one over another to form the stator core 103.

A power line (unillustrated) electrically connected to the coil 104 is drawn out from the stator 110, and the power line is connected to a power source (unillustrated) disposed outside the motor 100 through a through hole provided in the housing 102. During operation of the motor 100, for example, a three-phase alternating current is supplied to the coil 104, and a rotating magnetic field is formed around the rotor 400.

The rotor 400 includes a rotating axis 200 which axially extends in the interior space 101 and a rotor component member 300 which is fixed to a radially outer side of the rotating axis 200. The motor 100 generates a rotation power by a magnetic interaction between the rotor 400 and the stator 110, and the rotating axis 200 and the rotor component member 300 integrally rotates about the axial center $O_1$.

The rotor component member 300 is fixed to an outer circumferential surface of the rotating axis 200 by a press-fitting. The press-fitting is performed by axially moving the rotor component member 300 relative to the rotating axis 200. In other words, while the rotating axis 200 is fixed, the rotor component member 300 is axially moved, or, while the rotor component member 300 is fixed, the rotating axis 200 is axially moved, or, both the rotating axis 200 and the rotor component member 300 are axially moved, thereby each performing the press-fitting. Hereinafter, the press-fittings as described above will be uniformly indicated as "press-fitting the rotating axis 200 into the rotator member 300."

Figure 2:
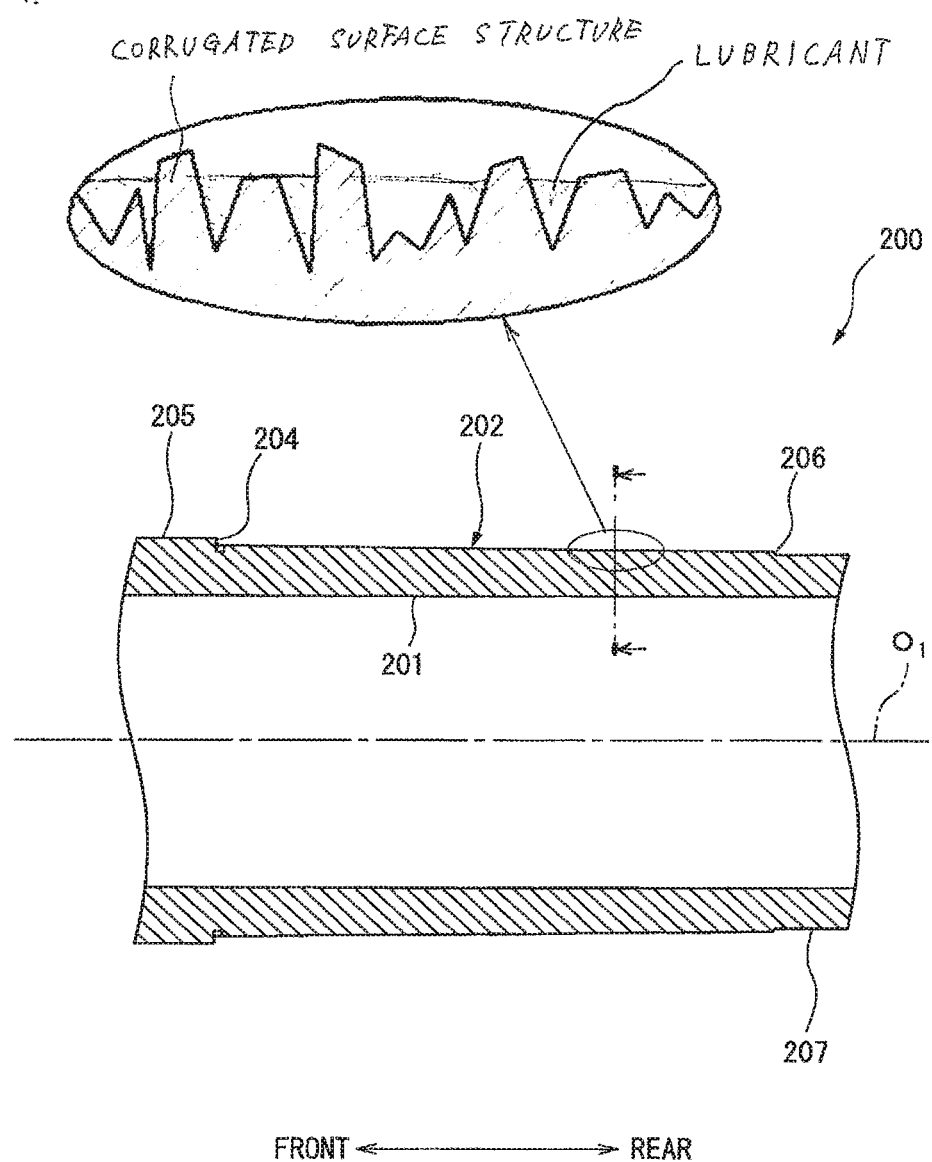
FIG. 2 is a cross-sectional view of a rotating axis as illustrated in FIG. 1.

Next, the rotating axis according to the embodiments of the present invention will be described with reference to FIG. 2. FIG. 2 is a cross-sectional view of the rotating axis 200 according to this embodiment. As illustrated in FIG. 2, the rotating axis 200 is a cylindrical member formed about the axial center $O_1$ and includes an inner circumferential surface 201 and an outer circumferential surface 202. Since the motor 100 according to this embodiment is configured as a built-in motor used for the main shaft 503 of the machine tool 500, the rotating axis 200 is formed into a cylindrical shape, which is not limitative. In other words, the rotating axis 200 may be formed by a solid member.

The rotating axis 200 is made of an iron-based metal, such as an iron-based material including S45C, STKM, SS, SCM, and SNCM. The axial center $O_1$ of the rotating axis 200 is an axial center of a rotating axis of the motor 100. An axially frontward side portion of the rotating axis 200 is rotatably supported by the housing 102 through a bearing (unillustrated) mounted on a wall portion on a frontward side of the housing 102. Similarly, an axially rearward side portion of the rotating axis 200 is rotatably supported by the housing 102 through a bearing (unillustrated) mounted on a wall portion on a rearward side of the housing 102.

The outer circumferential surface 202 of the rotating axis 200 includes a tapered surface 203 formed about the axial center $O_1$. The tapered surface 203 has a diameter which gradually enlarges from an axially rearward side toward an axially frontward side. An axially frontward side portion 205 of the outer circumferential surface 202 and a stepped portion 204 are an example of a contact portion provided for the convenience during manufacture. The tapered surface 203 continuously extends by a predetermined axial length from a taper start portion 206 to the stepped portion 204. A cylindrical surface 207 which linearly extends along the axial direction is formed on the outer circumferential surface 202 rearward of the taper start portion 206.

Note that the tapered surface 203 is preferably a linear tapered surface i.e. a conical surface. In this case, a radius of the tapered surface 203 linearly increases from the taper start portion 206 toward the stepped portion 204. The tapered surface 203 is preferably a linear tapered surface having a taper ratio of, for example, 1/200 to 1/30.

The contact portion 205 and the stepped portion 204 are an example of a design for facilitating the assembly operation during manufacture. The contact portion 205 has a cylindrical outer circumferential surface extending along the axial direction and is formed in such a manner as to protrude radially outside from the tapered surface 203, thereby forming the stepped portion 204 between the contact portion 205 and the tapered surface 203.

Figure 3:
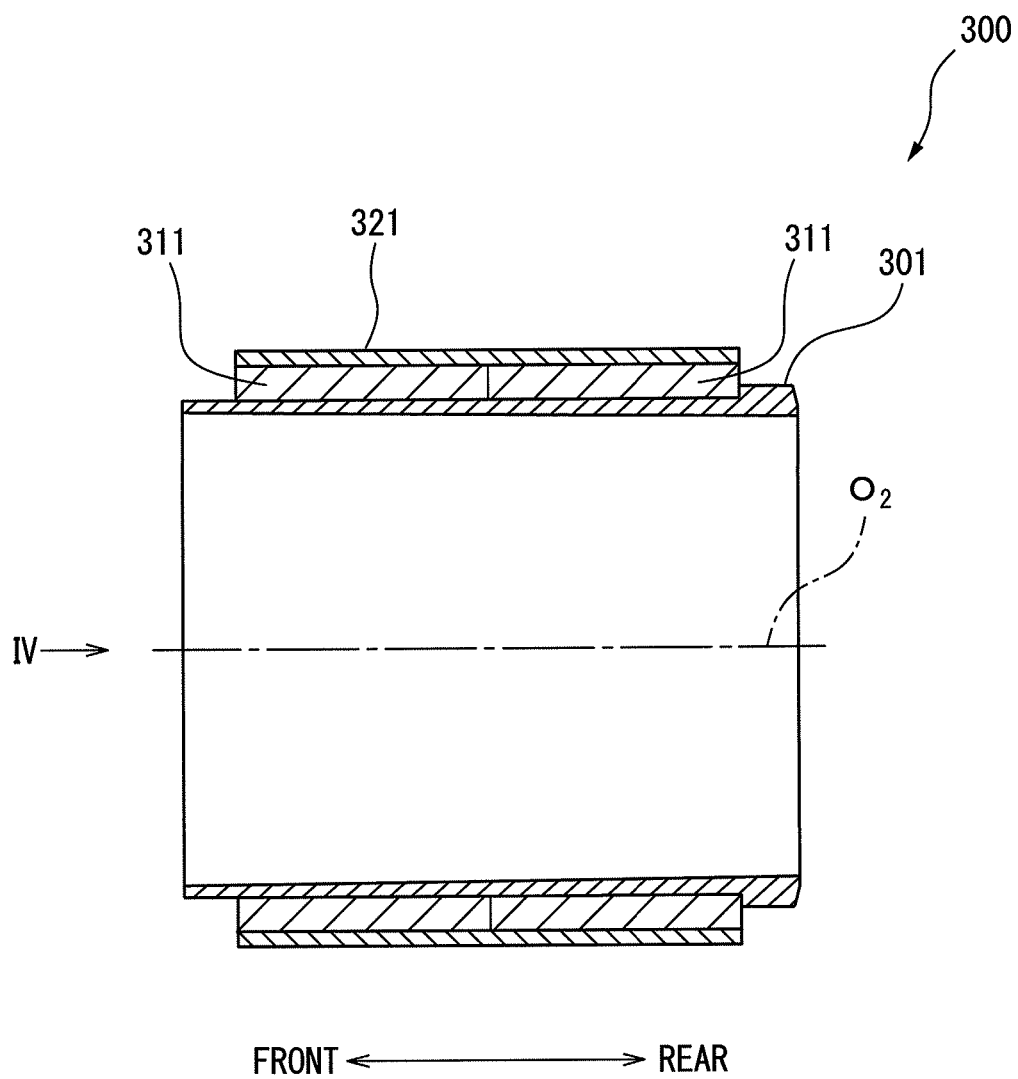
FIG. 3 is a cross-sectional view of a rotor component member as illustrated in FIG. 1.
Figure 4:
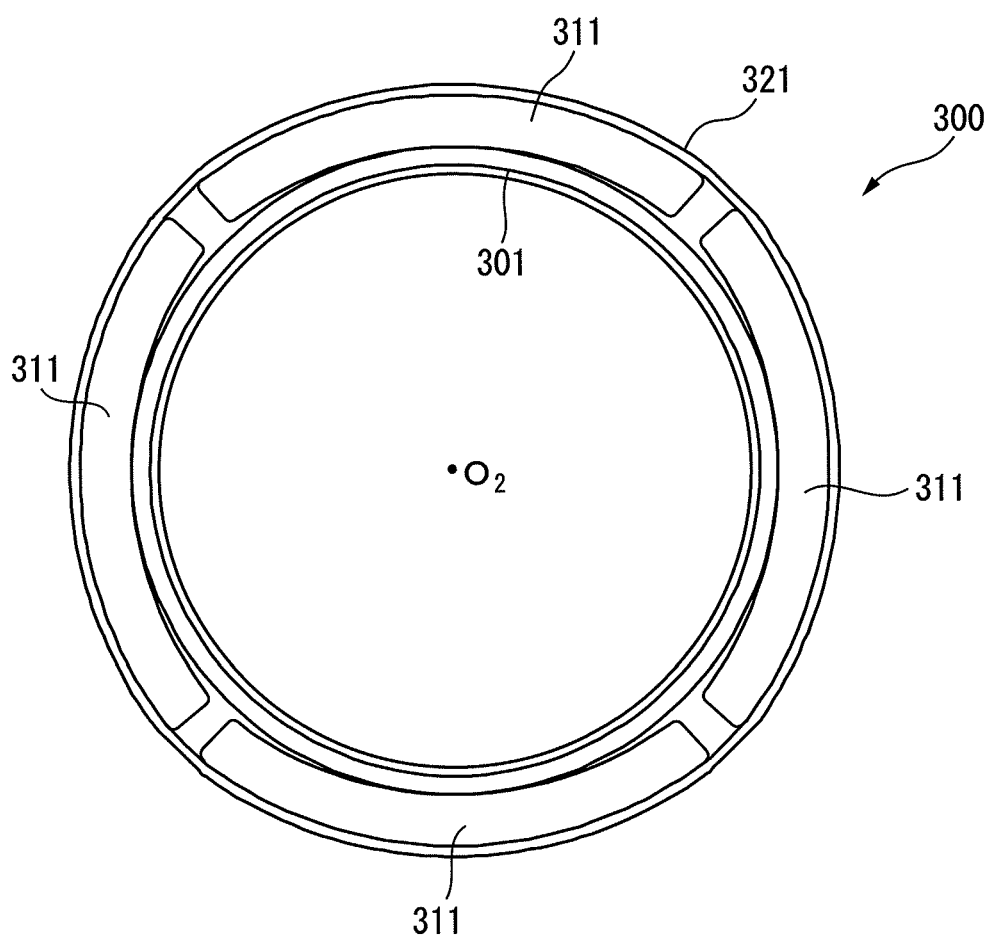
FIG. 4 is an external view of the rotor component member as illustrated in FIG. 1 that is viewed from an axial direction.

Next, the rotor component member according to the embodiments of the present invention will be described with reference to FIGS. 3-7. FIG. 3 is a cross-sectional view of the rotor component member 300 according to this embodiment, and FIG. 4 is an external view (view taken in the direction of the arrow IV in FIG. 3) of the rotor component member 300 that is viewed from the axial direction. As illustrated in FIGS. 3 and 4, the rotor component member 300 includes a cylindrical sleeve 301, a plurality of magnets 311 arranged in such a manner as to be circumferentially aligned, and a holding member 321 which covers the entirety of the plurality of magnets 311 from radially outside.

The magnets 311 are permanent magnets each having an inner diameter side formed into a circular arc shape along an outer circumferential surface 305 of the sleeve 301 i.e., magnets each having a partial cylindrical shape. In an example of FIG. 4, four of the magnets 311 are arranged circumferentially at regular intervals along the outer circumferential surface 305 of the sleeve 301. Note that a different number of magnets 311 from that of magnets 311 as in the example of FIG. 4 may be circumferentially arranged. In other words, the number of magnets 311 may be other than four as long as the plurality of magnets 311 is circumferentially arranged in a symmetric manner.

The magnets 311 may be axially divided into multiple parts in view of circumstances of manufacture and circumstances of forming of magnets, and in an example of FIG. 3, the magnets 311 are axially divided into two parts. Note that division into three or more parts in the axial direction may be performed. Further, the magnets 311 positioned on the axially rearward side are arranged at corresponding positions in an axially aligned manner by providing the sleeve 301 with a structure, such as a projection portion 307. AS the magnets 311, for example, neodymium magnets having high magnetic energy can be used. Thereby, a compact and high output motor can be obtained and use for the main shaft 503 of the machine tool 500 is favorable. The magnets 311 are preferably firmly held on the outer circumferential surface 305 of the sleeve 301 in such a manner as not to slide at least in the circumferential direction, and may be fixed, for example, by using an adhesive agent.

Figure 5:
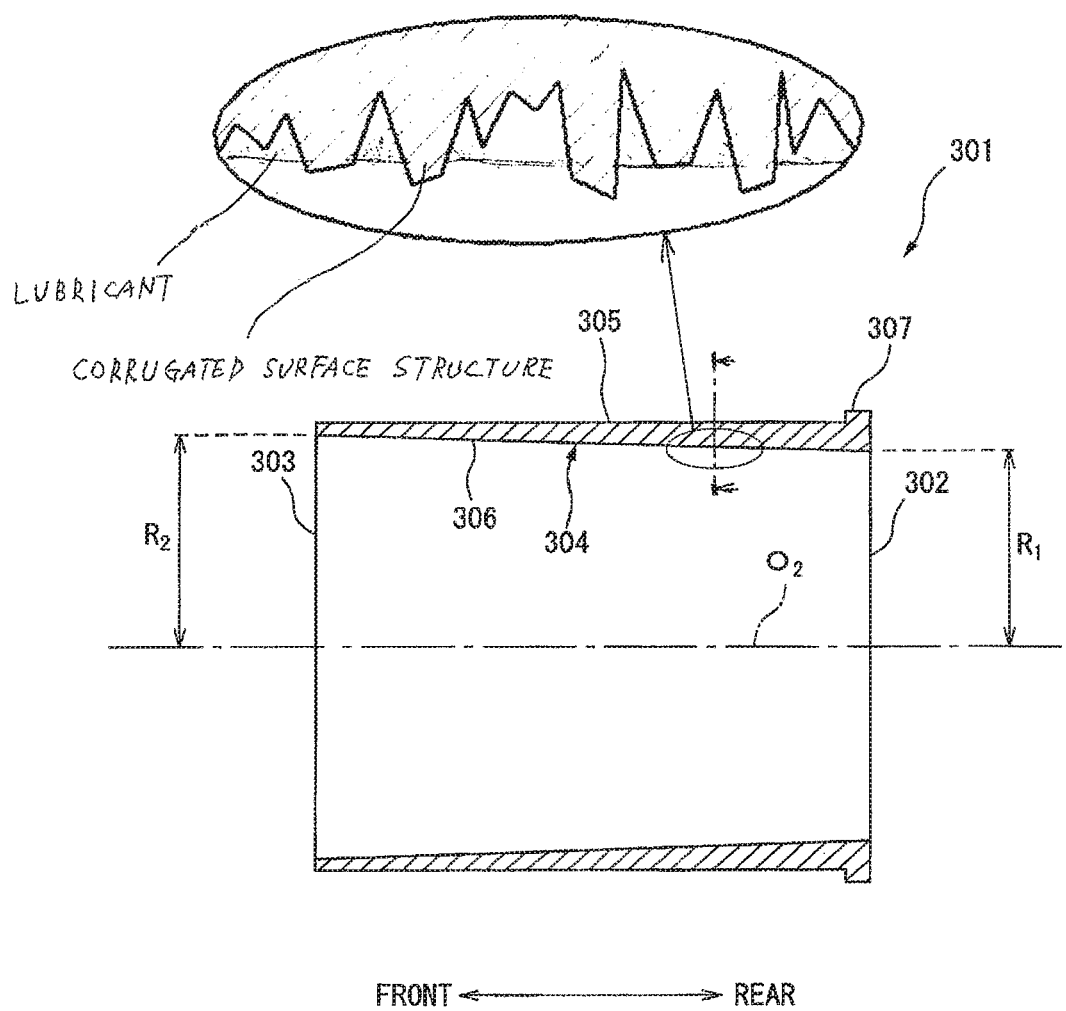
FIG. 5 is a cross-sectional view of a sleeve as illustrated in FIG. 3.

FIG. 5 is a cross-sectional view of the sleeve 301. As illustrated in FIG. 5, the sleeve 301 is a cylindrical member formed about the axial center $O_2$ and includes a first end portion 302 on the axially rearward side, a second end portion 303 on the axially frontward side, and an inner circumferential surface 304 and an outer circumferential surface 305 which extend along the axial direction. The projection portion 307 on an axially rear end of the sleeve 301 which projects radially outward from the outer circumferential surface 305 is an example of a design for facilitating alignment of positions of the magnets 311 in the axial direction during manufacture.

The sleeve 301 is made of an iron-based metal, such as an iron-based material including S45C, STKM, SS, SCM, and SNCM. The inner circumferential surface 304 of the sleeve 301 includes a tapered surface 306 formed about the axial center $O_2$. The tapered surface 306 has a diameter which gradually enlarges from the axially rearward side toward the axially frontward side. From the first end portion 302 to the second end portion 303, the tapered surface 306 continuously extends at least over an axial section (magnet mounting section) in which the magnets 311 are mounted on the outer circumference. In other words, the tapered surface 306 is a tapered surface formed in the magnet mounting section of the inner circumferential surface of the sleeve 301 and having a continuous and constant taper ratio, and has a radius which increases axially frontward.

The tapered surface 306 is a linear tapered surface having a constant taper ratio. The radius of the tapered surface 306 linearly increases from the first end portion 302 toward the second end portion 303 while ranging from a radius $R_1$ of the tapered surface 306 at the first end portion 302 to a radius $R_2$ ($>R_1$) of the tapered surface 306 at the second end portion 303. The taper ratio of the tapered surface 306 is preferably set within a range of, for example, 1/200 to 1/30.

A degree of taper of the tapered surface 306 is set in such a manner as to correspond to a degree of taper of the tapered surface 203 of the rotating axis 200. Further specifically, when the tapered surface 203 of the rotating axis 200 and the tapered surface 306 of the sleeve 301 are each a linear tapered surface, the tapered surface 203 and the tapered surface 306 are set in such a manner as to have an identical or substantially identical taper ratio (1/100, for example).

When the motor 100 as illustrated in FIG. 1 is assembled, the sleeve 301 is fitted on the tapered surface 203 of the rotating axis 200 by interference fit such that the axial center $O_1$ of the rotating axis 200 and the axial center $O_2$ of the sleeve 301 correspond to each other. In this state, the second end portion 303 of the sleeve 301 and the stepped portion 204 come into contact with each other, and the radius $R_2$ and of the tapered surface 306 at the second end portion 303 and the radius of the tapered surface 203 at a front end are the same or substantially the same.

In addition, in this state, the tapered surface 306 of the sleeve 301 and the tapered surface 203 of the rotating axis 200 are in full contact with each other with a high surface pressure, and the sleeve 301 is pressed toward a radially outer side by the rotating axis 200. Note that a mounting structure of the sleeve 301 on the rotating axis 200 will be described later.

Figure 6:
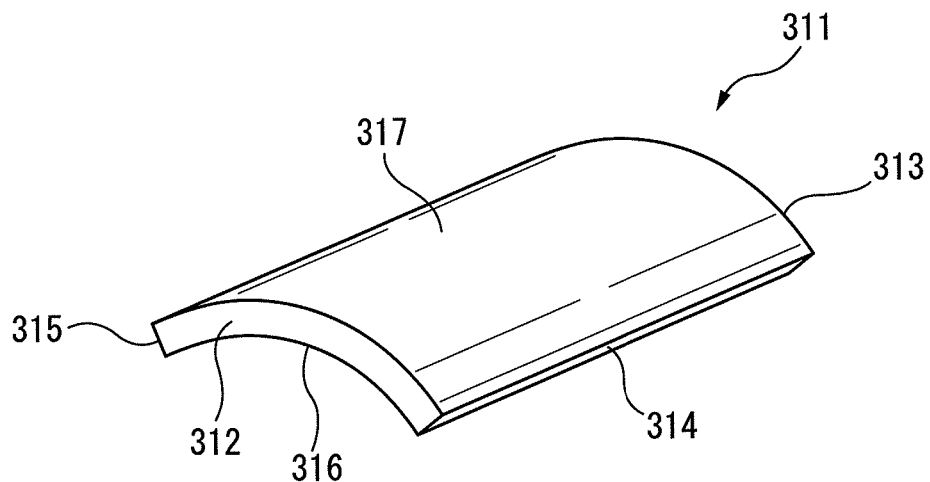
FIG. 6 is a perspective view of one of magnets as illustrated in FIG. 3.

FIG. 6 is a perspective view of one of the magnets 311. As illustrated in FIG. 6, each magnet 311 is a circular arc magnet piece having an inner diameter of a predetermined radius of curvature. Specifically, each magnet 311 includes an end surface 312 on the axially frontward side, an end surface 313 on the axially rearward side, an end surface 314 on one end in the circumferential direction, an end surface 315 on the other end in the circumferential direction, an inner circumferential surface 316 on the radially inner side, and an outer circumferential surface 317 on the radially outer side. The inner circumferential surface 316 of each magnet 311 has a circular arc shape (constant curvature), whereas the outer circumferential surface 317 is made of an optional curved surface having a circular arc shape or a shape other than a circular arc shape, a plane, or a combination of a curved surface and a plane.

In an example of FIG. 6, the end surface 312, the end surface 313, the end surface 314, and the end surface 315 are clearly illustrated as an example of the embodiments, but the end surfaces may be curved surfaces or minimum surfaces in contact with a tapered surface or a curved surface depending on circumstances, such as a magnetic circuit design and a specification of the motor, and thus in practice the end surfaces are not always clearly present. In addition, sides forming each surface are in practice subjected to chamfering or removed in a gently-sloping manner to by a curved surface, and thus are not always delimited by clear lines.

Figure 7:
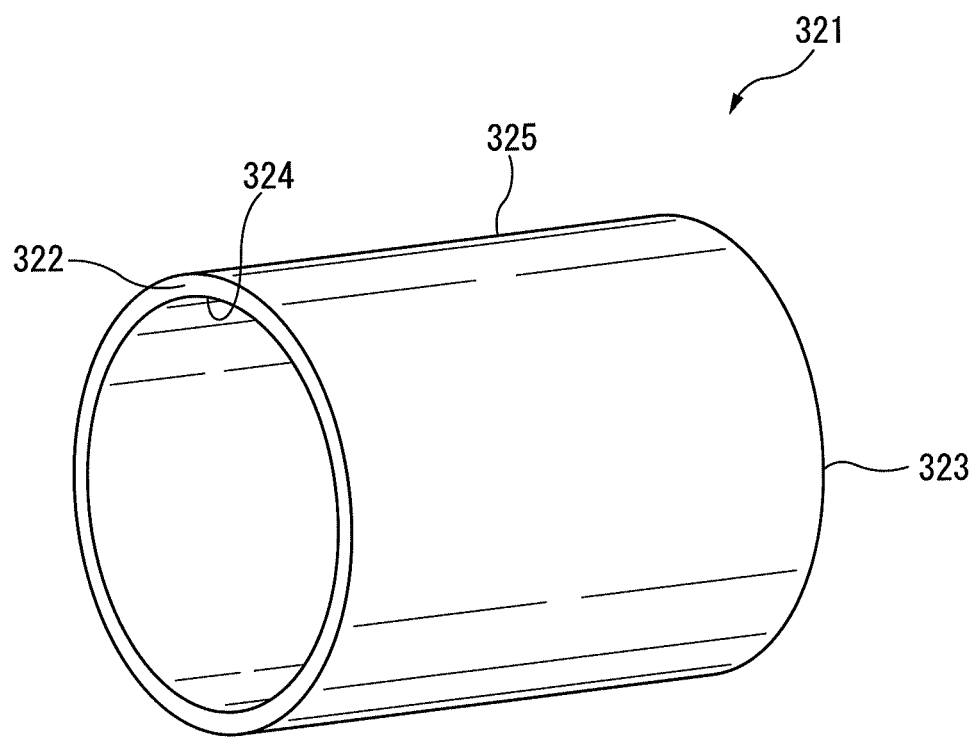
FIG. 7 is a perspective view of a holding member as illustrated in FIG. 3.

FIG. 7 is a perspective view of the holding member 321. As illustrated in FIG. 7, the holding member 321 is a cylindrical member axially extending, and has a function of surrounding the plurality of magnets 311 to hold the magnets 311. Specifically, the holding member 321 includes an end surface 322 on the axially frontward side, an end surface 323 on the axially rearward side, a cylindrical inner circumferential surface 324 and an outer circumferential surface 325. In an example of FIG. 7, the end surface 322 and the end surface 323 are clearly illustrated as an example of the embodiments, but the end surfaces are not always clearly present depending on a material, a structure, and a manufacturing method of the holding member. Further, a cross-sectional shape of each of the inner circumferential surface 324 and the outer circumferential surface 325 is not limited to a circle.

The holding member 321 has a high strength against deformation, such as expansion toward the radially outer side. In other words, the holding member 321 has a radius (diameter) which is hard to vary. In addition, in view of prevention of heat generation due to magnetic flux and performance reduction due to leakage of magnetic flux, the holding member 321 is preferably made of a nonmagnetic material. Further, the holding member 321 preferably has a small density so as to reduce a centrifugal force generated by rotation. The holding member 321 is made of, for example, a cylindrical molded body. Note that a material forming the holding member 321 may be wound around the outer circumferential surface 317 of each of the plurality of magnets 311, thereby forming the holding member 321. For example, a thread-shaped, belt-shaped, or sheet-shaped material may be wound plural times around the outer circumferential surface 317 of each magnet 311 while surrounding the same in a rotation direction before a predetermined thickness is obtained, thereby being formed.

As a material of the holding member 321, a material excellent in specific strength (tensile strength per unit density), such as a carbon fiber, a glass fiber, an aramid fiber, a silicon carbide fiber, a boron fiber, a titanium alloy fiber, an ultra-high-molecular-weight polyethylene fiber, or a polybutylene terephthalate fiber, is favorable. Further, as a material of the holding member 321, a fiber reinforced resin (FRP) using a carbon fiber, a glass fiber, an aramid fiber, a silicon carbide fiber, a boron fiber, a titanium alloy fiber, an ultra-high-molecular-weight polyethylene fiber, or a polybutylene terephthalate fiber, or composite materials in which some of these are combined with each other are also favorable. Further, as a material of the holding member 321, a nonmagnetic metal, such as austenite-based stainless steel, titanium, or a titanium alloy, may be used.

The holding member 321 is fitted on the radially outer side of the plurality of magnets 311 in such a manner as to surround each magnet 311 from the radially outer side, and when the motor 100 as illustrated in FIG. 1 is assembled, the sleeve 301 is pressed toward the radially outer side by the rotating axis 200. The press urges the sleeve 301 to deform toward the radially outer side, which presses each magnet 311 toward the radially outer side. On the other hand, as described above, the holding member 321 has a high strength against deformation, such as expansion toward the radially outer side. Consequently, the pressure applied from the magnets 311 is received and, as a reaction force thereof, the magnets 311 are pressed back toward the radially inner side.

The configuration allows the magnets 311 to be firmly sandwiched between the sleeve 301 and the holding member 321. Thereby, when the rotor component member 300 rotates at a high speed while the motor 100 is driven, a move (so called racing) of the magnets 311 relative to the sleeve 301 and the holding member 321 in the circumferential direction can be prevented.

An interference of the holding member 321 is set such that a fixing torque between the sleeve 301 and the rotating axis 200 and a fixing torque between the magnets 311 and the sleeve 301 exceeds a maximum torque of the motor 100 over the entire range of the number of rotations performable by the motor 100. Thereby, the fixing torque between the rotating axis 200 and the sleeve 301 and the fixing torque between the sleeve 301 and the magnets 311 exceeds the maximum torque of the motor 100 regardless of the number of rotations of the motor 100. Consequently, a positional displacement between the rotating axis 200 and the sleeve 301 and between the sleeve 301 and the magnets 311 can be prevented from occurring while the motor 100 is driven.

Furthermore, in order to prevent positional displacement of the rotor component member 300 (sleeve 301) relative to the rotating axis 200 during rotation of the motor 100, a sufficient interference between the rotating axis 200 and the sleeve 301 is to be provided. In this regard, fitting the rotating axis 200 and the sleeve 30 to each other through the tapered surfaces 203 and 306 as in this embodiment enables a sufficient interference in comparison with fitting by shrink fit. However, when press-fitting is performed through the tapered surfaces 203 and 306, interference increases as a press-fitting amount increases, and contact area of the tapered surfaces 203 and 306 increases so that a press-fitting load during press-fitting of the rotating axis 200 into the rotor component member 300 increases. Consequently, a deformation of an axial end surface of the rotating axis 200 and an axial end surface of the sleeve 301 to which a press-fitting load is applied by a press device, distortion and a flexure of the rotating axis 200, and the like may occur. In addition, in order to generate a large press-fitting load, a large-scale press device is to be provided, and therefore manufacturing costs increase.

In order to decrease a press-fitting load Lo be applied, a method in which a lubricant is applied to fitting surfaces of the rotating axis 200 and the sleeve 301 (the outer circumferential surface 202 of the rotating axis 200 and the inner circumferential surface 304 of the sleeve 301) so as to reduce friction force on the fitting surfaces during press-fitting is considered. However, when a lubricant is applied to the fitting surfaces, friction force on the fitting surfaces during rotation of the motor 100 is reduced so that of the rotor component member 300 relative to the rotating axis 200 may occur.

On the other hand, as another method for decreasing a press-fitting load to be applied, a method in which an oil passage from the first end portion 302 toward the inner circumferential surface 304 is formed in the projection portion 307 of the sleeve 301, an high-pressure oil is introduced through the oil passage to the inner circumferential surface 304 during press-fitting, and an inner diameter of the sleeve 301 is temporarily enlarged by hydraulic pressure is considered. However, according to this method, in order to supply hydraulic pressure to the inner circumferential surface of the sleeve 301, a hydraulic device is to be provided, and therefore manufacturing costs increase. Further, forming the oil passage in the sleeve 301 results in reducing the strength of the sleeve.

Then, in this embodiment, in order to decrease a press-fitting load during press-fitting of the rotating axis 200 into the rotor component member 300 while increasing a fixing torque of the rotor component member 300 relative to the rotating axis 200, and in order to prevent a positional displacement of the rotor component member 300 relative to the rotating axis 200 during rotation of the motor 100, the rotor 400 is configured in the following manner.

The tapered surface 203 of the rotating axis 200 and the tapered surface 306 of the sleeve 301 each have a corrugated surface structure which stores a lubricant. The surface structure is obtained, for example, by subjecting the tapered surfaces 203 and 306 to a chemical oxidation treatment. The chemical oxidation treatment is phosphoric acid based, sulfuric acid based, hydrochloric acid based, oxalic acid based, chromic acid based, or the like. In this embodiment, since the rotating axis 200 and the sleeve 301 are both made of an iron-based metal, a phosphoric acid-based, a sulfuric acid-based, or a hydrochloric acid-based oxidation coating treatment is preferably performed, and among them, the phosphoric acid-based oxidation coating treatment, particularly a manganese phosphate-based oxidation coating treatment is favorably performed.

When the manganese phosphate-based phosphate coating treatment is performed on the tapered surfaces 203 and 306, fine crystals of fine phosphate having a size of several μm to several tens μm are precipitated on the tapered surfaces 203 and 306. Consequently, fine bumpiness is produced on the tapered surfaces 203 and 306, and a surface area of each of the tapered surfaces 203 and 306 increases. Thereby, when a lubricant is applied to each of the tapered surfaces 203 and 306 while the rotating axis 200 and the rotor component member 300 are separated from each other, the lubricant can be favorably stored due to the bumpiness on the surfaces. Forming the corrugated surface structure on each of the tapered surfaces 203 and 306 in this manner enables the amount of a lubricant per unit surface area to increase. Consequently, a coefficient of friction decreases when the rotating axis 200 is press-fitted into the rotor component member 300 so that a press-fitting load can be decreased.

When the rotating axis 200 is press-fitted into the rotor component member 300 (sleeve 301), the tapered surfaces 203 and 306 slide against each other, thereby each surface structure wears. Note that each surface structure may be not only worn but also deformed. At this time, a surface pressure between the tapered surfaces 203 and 306 causes the lubricant having fluidity to be gradually extruded out to axially outside. After completion of the press-fitting, the lubricant is discharged, the tapered surfaces 203 and 306 are in full contact with each other, and the coefficient of friction between the tapered surfaces 203 and 306 increases. Thereby, a friction force between the tapered surfaces 203 and 306 increases so that the fixing torque between the sleeve 301 and the rotating axis 200 increases, which prevents positional displacement of the rotor component member 300 relative to the rotating axis 200 during rotation of the motor 100.

When the tapered surface 306 of the sleeve 301 is subjected to the phosphate treatment, the entire sleeve is preferably dipped into a treatment solution, and the entire surface of the sleeve 301 is preferably subjected to the phosphate treatment. In other words, when the range of a surface treatment is limited, a masking and the like are to be performed, whereas, when the surface treatment is performed on the entire sleeve, a labor for the masking and the like is saved, and the surface treatment can be easily performed. Further, not only the tapered surface 305 of the sleeve 301 but also the outer circumferential surface 305 are subjected to the phosphate treatment so that an adhesive force during fixation of the magnets 311 on the outer circumferential surface 305 of the sleeve 301 through an adhesive agent can be also enhanced.

The corrugated surface structure may be configured to include a plurality of depressions which store a lubricant and wall portions which surround each depression. A depth and a diameter of each depression is each preferably several μm to 100 μm or less, further preferably 60 μm or less. In this case, as the tapered surfaces 203 and 306 slide during press-fitting of the rotating axis 200, the wall portions of the surface structure gradually wear away, and the lubricant gradually flows out of the depressions. Thereby, a lubrication effect during press-fitting can be obtained, and a press-fitting load can be decreased. After completion of the press-fitting, the wall portions wear away and contact area increases, while a surface pressure between the tapered surfaces 203 and 306 causes the lubricant to be extruded out of the tapered surfaces 203 and 306. Thereby, the tapered surfaces 203 and 306 are in full contact with each other, while the coefficient of friction between the tapered surfaces 203 and 306 increases, so that the fixing torque between the sleeve 301 and the rotating axis 200 increases.

Each depression can be formed, for example, in a manner similar to dimples of golf balls. Note that, different from golf balls, a shape and a size of each depression are not required to be uniform. In other words, each depression may have a shape other than a spherical shape and a curved surface shape, and may be formed by a flat or curved surface-shaped bottom surface and a wall surface. Further, a plan-view shape of each depression may not be circular. The depressions may be formed into such a shape that one surface of a honeycomb structure is covered by a plane. Note that hexagon depressions may not be strictly aligned, but may be configured as long as spaces each having such a depth as to store a lubricant and wall portions for partitioning each space are included. The surface structure having such depressions and wall portions can be obtained by performing a chemical surface treatment or a blast treatment on the tapered surfaces 203 and 306. The blast treatment includes, for example, a sandblast and a satin finish treatment.

Note that the corrugated surface structure may be provided on either the tapered surface 203 of the rotating axis 200 or the tapered surface 306 of the sleeve 301. For example, the corrugated surface structure may be provided only to the tapered surface 203, or only to the tapered surface 306. If at least one of the tapered surface 203 of the rotating axis 200 and the tapered surface 306 of the sleeve 301 has the corrugated surface structure which stores a lubricant, the coefficient of friction between the tapered surfaces 203 and 306 during press-fitting can be decreased and the coefficient of friction after the press-fitting can be increased.

Further, in this embodiment, the tapered surface 203 of the rotating axis 200 is subjected to a heat treatment or a surface treatment such that the tapered surface 203 of the rotating axis 200 is harder than the tapered surface 306 of the sleeve 301. The heat treatment or the surface treatment is preferably performed when only the tapered surface 306 of the sleeve 301 has the corrugated surface structure. If the tapered surfaces slide against each other when the surface hardness is low and the surface pressure is high, a scoring, a tear, or a deposition of the tapered surfaces, or the like may occur. Enhancing the surface hardness of the rotating axis 200 allows these to be prevented. Note that, since a diameter of the sleeve 301 enlarges during press-fitting of the rotating axis 200, enhancing the hardness causes a crack in the sleeve 301. Therefore, enhancing the surface hardness of not the sleeve 301 but the rotating axis 200 by the heat treatment or the surface treatment is preferable.

The heat treatment includes a local heat treatment such as an induction hardening, a carburization, a vacuum carburization, a laser hardening. The carburization is particularly favorable as to press-fitting by interference fit because increasing the amount of carbon allows a slide during sliding to be improved. The surface treatment includes a plating or nitriding treatment. For example hard chrome plating is particularly favorable because the surface is smoothed while the surface hardness can be enhanced. Similarly, the nitriding treatment is particularly favorable because the surface hardness is enhanced while sliding of the surface is improved. Note that materials having hardness different from each other may be used for the corresponding rotating axis 200 and sleeve 301 such that the tapered surface 203 of the rotating axis 200 is harder than the tapered surface 306 of the sleeve 301. For example, the sleeve 301 may be made of SS400 and the rotating axis 200 may be made of SCM435 or SNCM630, and in this case, the heat treatment and the surface treatment on the tapered surface 203 may be omitted.

Next, a manufacturing method of the rotor 400 according to the embodiments of the present invention will be described. First, the sleeve 301 is prepared. The sleeve 301 is obtained by the following procedure. For example, an inner circumferential surface and an outer circumferential surface of a cylindrical member made of an iron-based metal is subjected to cutting processing, thereby forming the tapered surface 306 and the outer circumferential surface 305, while forming the projection portion 307. Subsequently, the tapered surface 306 is subjected to the oxidation treatment, the blast treatment, or the like, thereby providing the entire tapered surface with the corrugated surface structure having a height of approximately several tens µm. The entire sleeve is dipped into a phosphoric acid-based treatment solution, and the tapered surface 306 and the outer circumferential surface 305 of the sleeve 301 is subjected to the phosphate treatment (for example, manganese phosphate treatment) so that the surface structure is obtained.

Further, the magnets 311 and the holding member 321 are prepared. Each magnet 311 is obtained by configuring a permanent magnet in which the inner circumferential surface 316 has a substantially circular arc shape having a predetermined radius of curvature. The holding member 321 is obtained, for example, by a carbon fiber reinforced resin formed into a cylindrical shape.

Next, the plurality of magnets 311 is arranged at regular intervals along the outer circumferential surface 305 of the sleeve 301. In this case, the magnets 311 are arranged such that the magnets 311 circumferentially adjacent to each other have inner circumferential side magnetic poles different from each other and outer circumferential side magnetic poles different from each other. For example, when four of the magnets 311A-311D are circumferentially arranged, the magnets 311A and 311B, 311B and 311C, 311C and 311D, 311D and 311A are arranged adjacent to each other. At this time, the magnets 311A-311D are arranged such that an inner circumferential side of the magnets 311A and 311C is an S pole and an outer circumferential side thereof is an N pole, while an inner circumferential side of the magnets 311B and 311D is an N pole and an outer circumferential side thereof is an S pole. In other words, the magnets 311A-311D are circumferentially arranged to face the outer circumferential surface 305 of the sleeve 301 such that the magnetic poles corresponding thereto alternate with each other in the circumferential direction.

Next, an adhesive agent is impregnated between the sleeve 301 and the plurality of magnets 311 which face each other before the holding member 321 is mounted in such a manner as to cover the plurality of magnets 311 from the radially outer side. In other words, the holding member 321 is fitted on the radially outer side of each magnet 311 such that the inner circumferential surface 324 of the holding member 321 face the outer circumferential surface 317 of each magnet 311. At this moment, the both may be fitted by loose fit or by interference fit to some degree. When interference fit is employed, such a slight interference that the holding member 321 does not come off is sufficient.

The adhesive agent is impregnated over the entire range between the outer circumferential surface 305 of the sleeve 301 and the inner circumferential surface of each magnet 311, or at least within a part of a region. The adhesive agent may be impregnated not before the magnets 311 are surrounded by the holding member 321 but after the magnets 311 are surrounded by the holding member 321. When the magnets 311 are arranged along the outer circumferential surface 305 of the sleeve 301, the adhesive agent may be applied to at least one of the outer circumferential surface 305 of the sleeve 301 and the inner circumferential surface 316 of each magnet 311.

Next, the rotating axis 200 as illustrated in FIG. 2 is prepared. The rotating axis 200 is obtained by the following procedure. For example, an outer circumferential surface of a cylindrical bar member is subjected to cutting processing to form the tapered surface 203. The cylindrical outer circumferential surface 207 and the contact portion 205 may be provided as necessary at the front and the rear of the tapered surface 203, respectively. Subsequently, the tapered surface 203 is subjected to the oxidation treatment or the blast treatment, thereby providing the entire tapered surface with the corrugated surface structure having a height of approximately several tens µm. Instead of providing the tapered surface 203 with the corrugated surface structure, or while providing the surface structure, the tapered surface 203 may be subjected to a heat treatment, such as a hardening, or a surface treatment, such as a plating and a nitriding treatment so that the tapered surface 203 of the rotating axis 200 is harder than the tapered surface 306 of the sleeve 301. When the sleeve 301 is made of, for example, SS400 and the rotating axis 200 is made of, for example, SCM435 or SNCM630, the rotating axis 200 is harder than the sleeve 301. In this case, the heat treatment and the surface treatment on the tapered surface 203 may be omitted.

Figure 8:
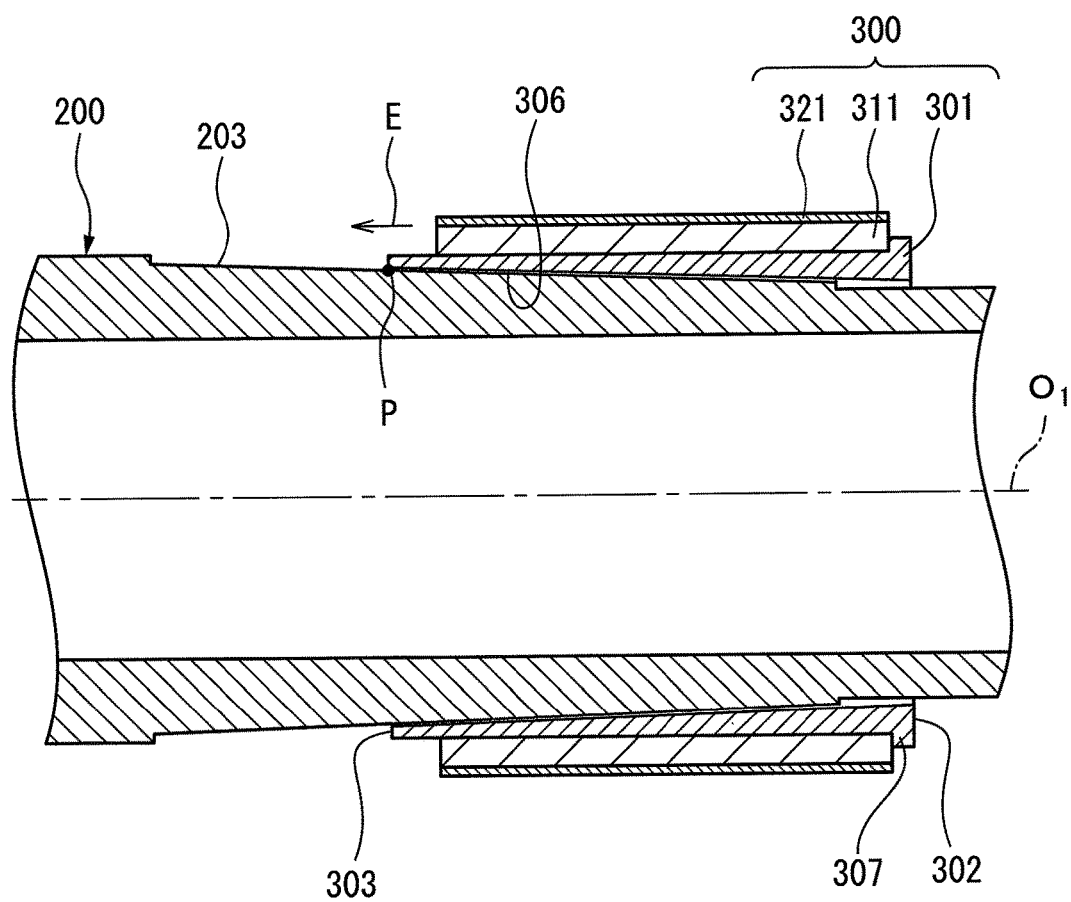
FIG. 8 is a cross-sectional view for describing a press-fitting step of press-fitting the rotor component member into the rotating axis.
Figure 9:
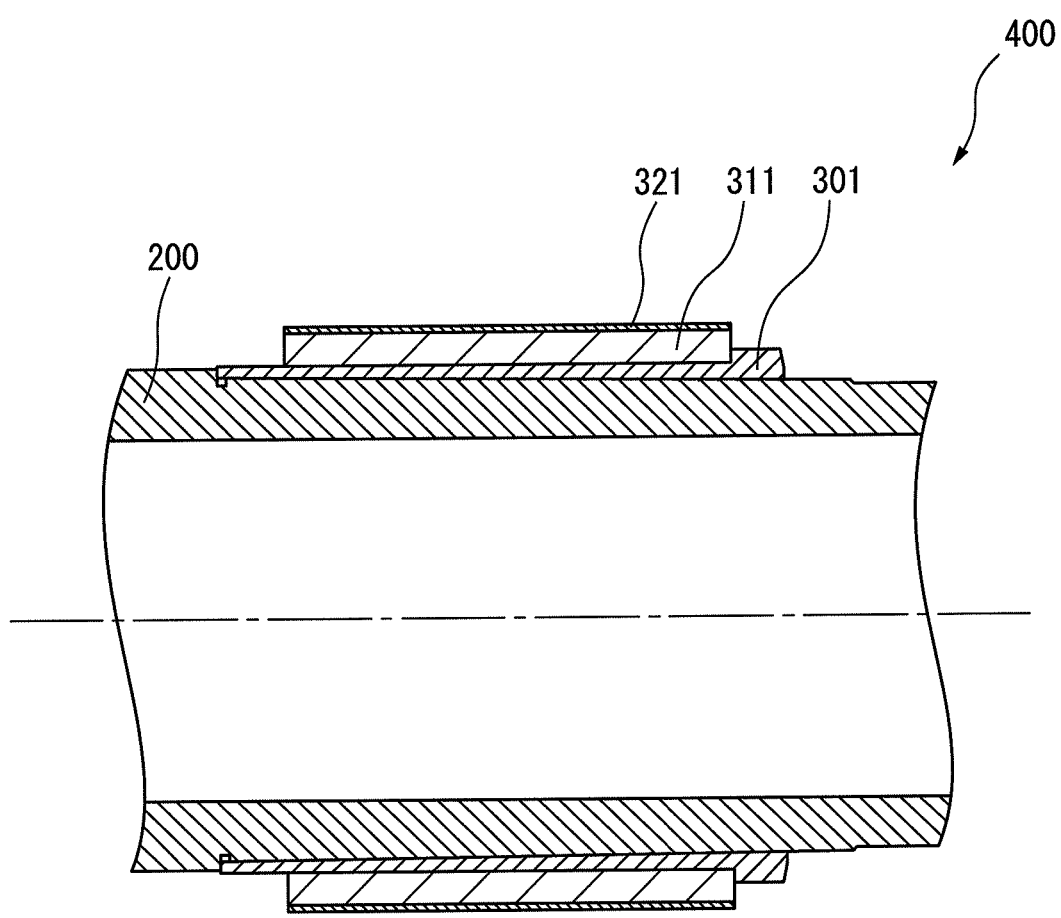
FIG. 9 is a cross-sectional view in which the rotor after the press-fitting step is illustrated.

Next, the rotor component member 300 is fitted from the axially rearward side of the rotating axis 200 before the adhesive agent hardens. In other words, the rotating axis 200 and the rotor component member 300 are press-fitted to each other. The press-fitting step will be specifically described. FIGS. 8 and 9 are diagrams for describing the press-fitting step. As illustrated in FIG. 8, first, the sleeve 301 of the rotor component member 300 is fitted on an axially rear end of the rotating axis 200 from a second end portion 303 side.

In this case, in the rotating axis 200, for example, an end surface (unillustrated) on an axially second side (frontward side) of the rotating axis 200 is held toward an axially first side (rearward side), while the end portion 302 (projection portion 307) of the sleeve 301 of the rotor component member 300 is pushed. In other words, the rotor component member 300 is pushed axially frontward as illustrated by the arrow E in FIG. 8. Thereby, an axially front end of the tapered surface 306 of the sleeve 301 and the tapered surface 203 of the rotating axis 200 come into contact with each other at a contact portion P.

From this state, the rotor component member 300 is further pushed relative to the rotating axis 200 toward the axially frontward side. Specifically, a press-fitting load is applied to an end surface of the projection portion 307 of the sleeve through the press device to push the rotor component member 300 toward the axially frontward side until the second end portion 303 of the sleeve 301 comes to a predetermined position, for example, comes into contact with the stepped portion 204 of the contact portion 203 as illustrated in an example of the drawing. Thereby, the rotating axis 200 is press-fitted into the rotor component member 300. Since the projection portion 307 has a radial thickness, a press-fitting load is applied to the end surface of the projection portion 307, thereby enabling relaxation of a surface pressure relative to the press-fitting load.

When the rotating axis 200 is press-fitted into the sleeve 301, the tapered surfaces 203 and 306 slide against each other, thereby each surface structure wears. Note that each surface structure may be not only worn but also deformed. When the surface structures are worn, the tapered surfaces 203 and 306 are in full contact with each other and a friction force between the tapered surfaces 203 and 306 increases, while a surface pressure between the tapered surfaces 203 and 306 causes the lubricant having fluidity to be gradually extruded out to axially outside.

During press-fitting of the rotating axis 200, the sleeve 301 moves axially frontward along the tapered surface 306 from the contact portion P to the stepped portion 204, and is expanded radially outward. In other words, in this state, the rotor component member 300 is fixed to the rotating axis 200 by interference fit. Note that, in this state, the sleeve 301 may deform beyond an elastic deformation region. While press-fitted to a predetermined position, the sleeve 301 is expanded radially outward by a force press-fitting the sleeve 301 and accordingly the magnets 311 move radially outward as well. Consequently, a radially outward pressing force operates on the holding member 321, and the holding member 321 is expanded radially outward as well.

Thereby, an elastic compressive force is stored in the holding member 321, and by this elastic compressive force, the magnets 311 and the sleeve 301 are sandwiched between the tapered surface 203 of the rotating axis 200 and the holding member 321. In such a case, by a pressure (surface pressure) generated between each of contact surfaces, the magnets 311 are fixed to the outer circumferential surface 305 of the sleeve 301, while the tapered surface 306 of the sleeve 301 is fixed to the tapered surface 203 of the rotating axis 200.

Figure 10:
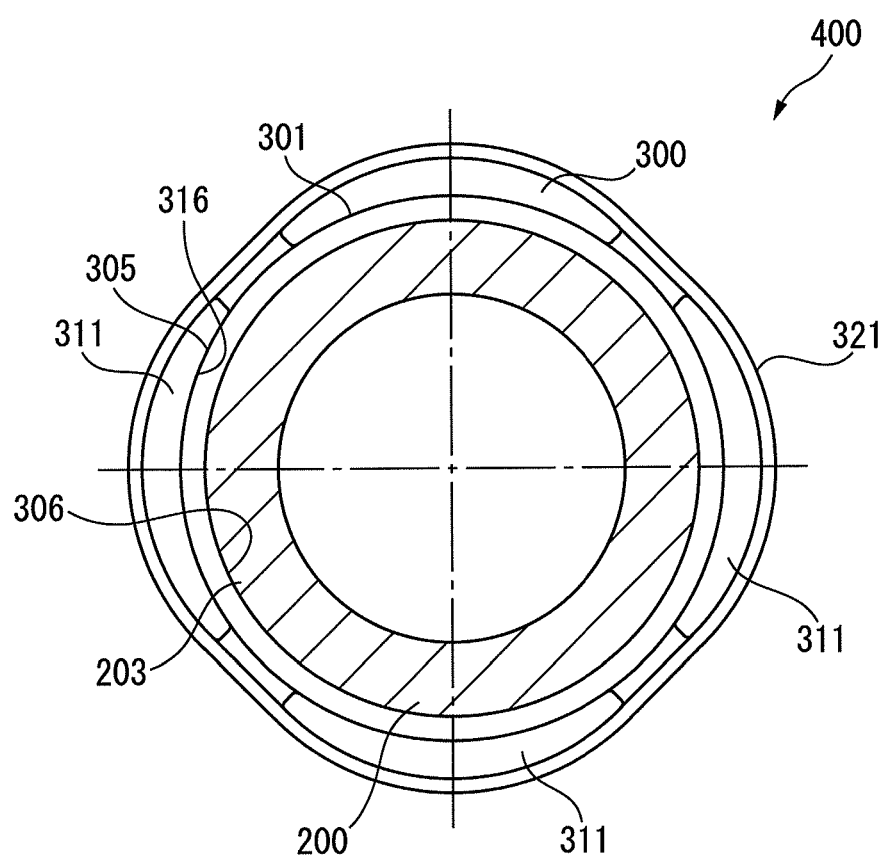
FIG. 10 is a cross-sectional view in which the rotor as completed is schematically illustrated.

In the above manner, the rotor 400 as illustrated in FIG. 9 is manufactured. FIG. 10 is a cross-sectional view in which the rotor 400 as completed is schematically illustrated. When the rotor 400 is completed, no lubricant is present between the tapered surfaces 203 and 306, and the tapered surfaces 203 and 306 are in full contact with each other so that a friction force between the tapered surfaces 203 and 306 is large. Consequently, the fixing torque between the sleeve 301 and the rotating axis 200 increases, which enables prevention of a positional displacement of the rotor component member 300 relative to the rotating axis 200 during rotation of the motor 100.

According to this embodiment, the following produced effects can be achieved.

(1) The rotor component member 300 includes: the sleeve 301 including the inner circumferential surface 304 press-fitted relative to the outer circumferential surface 202 of the rotating axis 200; and the magnets 311 mounted on the outer circumferential surface 305 of the sleeve 301. The inner circumferential surface 304 of the sleeve 301 includes the tapered surface 306 having a diameter that varies in taper along the axial center $O_2$, and the tapered surface 306 has a corrugated surface structure storing a lubricant and configured to wear away by press-fitting the rotor component member 300 relative to the rotating axis 200. In addition, the rotating axis 200 includes the outer circumferential surface 202 press-fitted relative to the inner circumferential surface 304 of the rotor component member 300 (sleeve 301), the outer circumferential surface 202 includes the tapered surface 203 having a diameter that varies in taper along the axial center $O_1$, and the tapered surface 203 has a corrugated surface structure storing a lubricant and configured to wear away by press-fitting the rotating axis 200 relative to the rotor component member 300.

Thereby, a friction force between the rotor component member 300 and the rotating axis 200 during press-fitting of the rotating axis 200 relative to the rotor component member 300 reduces, and a press-fitting load decreases so that the rotating axis 200 can be easily press-fitted into the rotor component member 300. Further, the press-fitting load decreases so that a general-purpose press device can be used during press-fitting, and fitting can be achieved with a large interference without special equipment. Further, a deformation at portions (end surface of the projection portion 307, and the like) which are points of application of a force in the rotating axis 200 and the sleeve 301 can be avoided, and a distortion and a flexure of the rotating axis 200 can be avoided as well.

In addition, after press-fitting the rotating axis 200 relative to the rotor component member 300, the surface structures of the corresponding tapered surfaces 203 and 306 wear away so that a friction force between the rotor component member 300 and the rotating axis 200 increases. Consequently, a positional displacement of the rotor component member 300 relative to the rotating axis 200 during high-speed rotation of the rotor 400 can be prevented. In other words, for example, when a lubricant having high viscosity or a solid lubricant, such as molybdenum dioxide is used for the tapered surfaces 203 and 306, a lubrication effect thereof remains after the press-fitting as well. Thus, the rotor component member 300 slides relative to the rotating axis 200 so that a torque appropriate for the motor 100 may not be generated. In contrast, in this embodiment, a lubricant effect does not remain after the press-fitting so that the rotor component member 300 fails to slide relative to the rotating axis 200 and a torque appropriate for the motor 100 can be generated.

(2) Such finely corrugated surface structures as to discharge the lubricant due to wear can be easily formed by subjecting the tapered surfaces 203 and 306 to an oxidation treatment or a blast treatment.

(3) When the sleeve 301 and the rotating axis 200 are made of an iron-based metal, using a phosphate coating treatment as an oxidation treatment coating is particularly effective in that a coefficient of friction between the tapered surfaces 203 and 306 during press-fitting decreases and the coefficient of friction increases after completion of the press-fitting.

(4) The rotor 400 includes: the rotating axis 200 rotating about the axial center $O_1$; and the rotor component member 300 including the inner circumferential surface 304 on which the outer circumferential surface 202 of the rotating axis 200 fits. The outer circumferential surface 202 of the rotating axis 200 and the inner circumferential surface 304 of the rotor component member 300 include corresponding tapered surfaces 203 and 306 each having a diameter that varies in a taper along the axial center $O_1$, the tapered surfaces 203 and 306 being in full contact with each other while the outer circumferential surface 202 of the rotating axis 200 is press-fitted relative to the inner circumferential surface 304 of the rotor component member 300, and at least one of the tapered surfaces 203 and 306 has a corrugated surface structure storing a lubricant before the rotating axis 200 is press-fitted relative to the rotor component member 300, while configured to wear away by press-fitting the rotating axis 200 relative to the rotor component member 300 to discharge the lubricant. Thereby, an increase in press-fitting load during press-fitting of the rotating axis 200 can be prevented and a desired fixing torque between the rotating axis 200 and the rotor component member 300 can be ensured after completion of the press-fitting so that racing of the rotor component member 300 relative to the rotating axis 200 can be prevented.

(5) When the rotating axis 200 is made of an iron-based metal, and the tapered surface 203 of the rotating axis 200 is subjected to a heat treatment or a surface treatment such that the tapered surface 203 is harder than the tapered surface 306 of the rotor component member 300, the surface hardness of the rotating axis 200 is enhanced and a scoring, a tear, a deposition and the like of the surface during press-fitting of the rotating axis 200 can be prevented. In this case, the hardness of the sleeve 301 is not higher than necessary, and a crack and the like of the sleeve 301 can be prevented when the sleeve 301 is expanded due to press-fitting of the rotating axis 200.

(6) Subjecting the tapered surface 203 of the rotating axis 200 to a plating or nitriding treatment as the surface treatment is favorable because the surface is smoothed while the surface hardness can be enhanced. When the tapered surface 203 of the rotating axis 200 is subjected to hardening as the heat treatment, similarly, the surface is smoothed while the surface hardness can be enhanced.

(7) The rotor component member 300 further includes: the plurality of magnets 311 arranged along the outer circumferential surface 305 of the sleeve 301; and the cylindrical holding member 321 surrounding the plurality of magnets 311, in which the sleeve 301 and the plurality of magnets 311 are sandwiched between the rotating axis 200 and the holding member 321 by an elastic restoring force toward a radially inner side that is produced in the holding member 321 by press-fitting the rotating axis 200 relative to the rotor component member 300. Thereby, when the rotor component member 300 rotates at a high speed, a move of the magnets 311 relative to the sleeve 301 and the holding member 321 in the circumferential direction can be prevented.

(8) When the magnets 311 are mounted on the outer circumferential surface 305 of the sleeve 301, subjecting the outer circumferential surface 305 to a phosphate coating treatment allows an adhesive force during fixation of the magnets 311 on the outer circumferential surface 305 through an adhesive agent to be enhanced. When the outer circumferential surface 305 and the tapered surface 306 of the sleeve 301 are both subjected to a phosphate coating treatment, this can be easily performed by dipping the entire sleeve into a treatment solution.

(9) In the rotor 400 in this embodiment, a sufficient interference of the rotor component member 300 is obtained so that the rotor component member 300 does not race relative to the rotating axis 200 and the rotor 400 cane be rotated at a high speed. Thus, the maximum number of rotations of the motor 100 including the rotor 400 can be increased and the output of the motor 100 can be increased.

(10) Using the motor 100 for the machine tool 500 allows a processing performance and a production performance of the machine tool 500 to be enhanced. When the motor 100 is a built-in motor for driving the main shaft of the machine tool 500, an operation of press-fitting the rotating axis 200 relative to the rotor component member 300 is performed by a user who is a purchaser of the motor, and thus the operational efficiency is particularly important. In this regard, the rotor 400 in this embodiment can prevent increase in press-fitting load, and thus is excellent in operational efficiency.

Note that, in the above embodiments, the magnets 311 and the sleeve 301 are fixed to each other by an adhesive agent, but the adhesive agent may be omitted. In the above embodiments, the plurality of magnets 311 are surrounded by the holding member 321, but the other cylindrical member may be disposed around the holding member 321. Thereby, joint portions at end portions of the holding member 321 can be protected from peeling due to a wind pressure during rotation of the rotor 400, and the lifetime of the rotor 400 can be extended.

Figure 11:
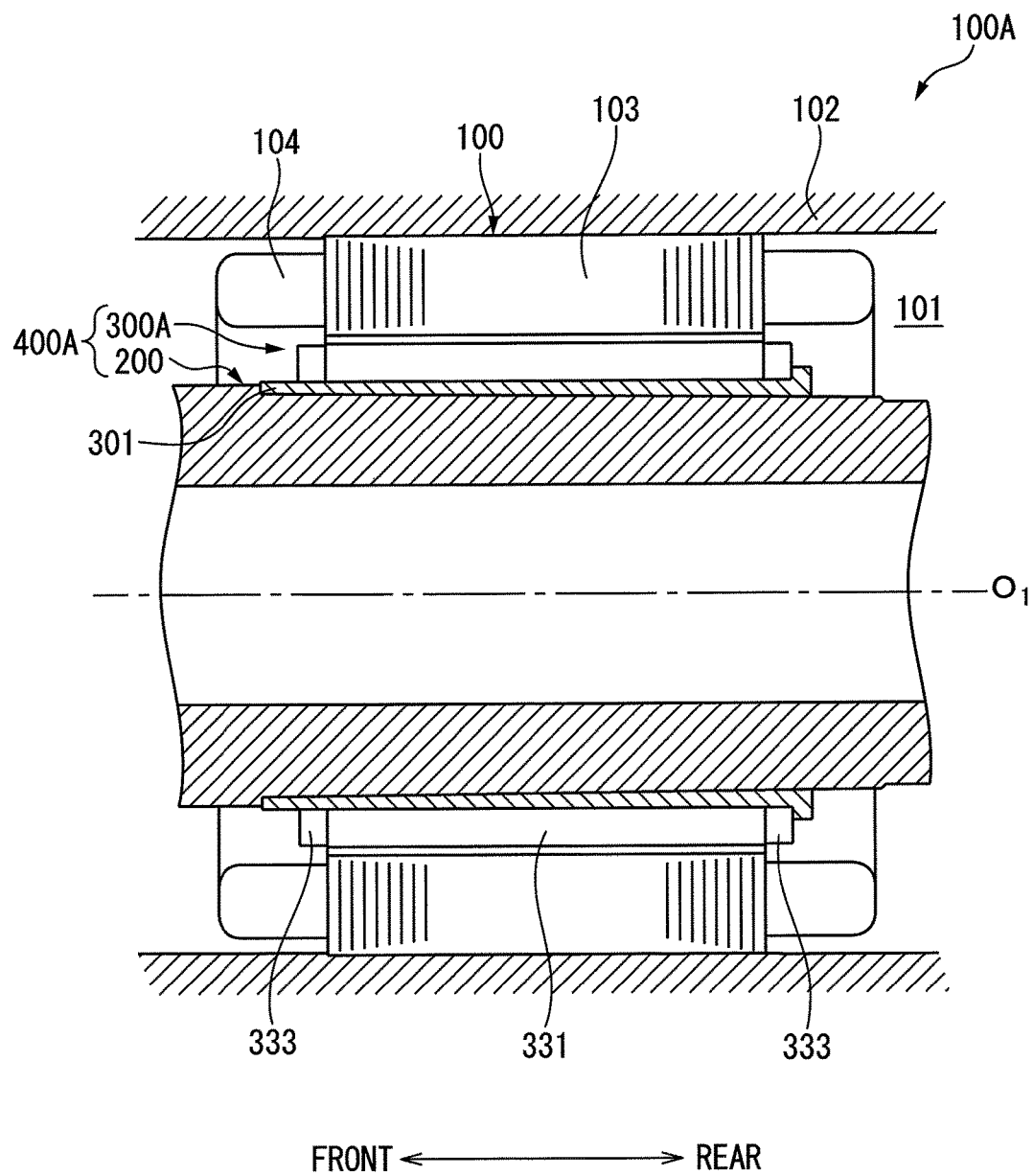
FIG. 11 is a diagram illustrating a modification of FIG. 1.
Figure 12:
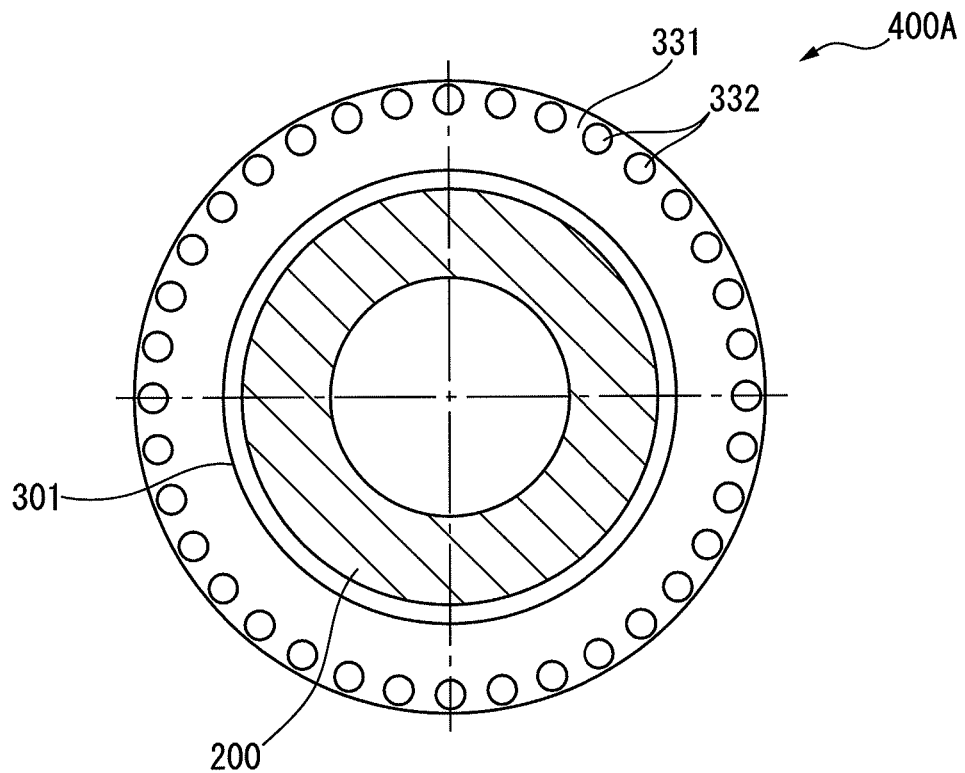
FIG. 12 is a cross-sectional view of a rotor used for a motor in FIG. 11.

In the above embodiments, the magnets 311 are mounted on the outer circumferential surface of the sleeve 301, but the magnets 311 can be replaced by a rotor component. Thus, the motor to which the rotor is applied may not be a surface magnet type motor (SPM type motor) but the other motor. FIG. 11 is a cross-sectional view (view taken in parallel to the axial center $O_1$) of a motor that illustrates an example in which a rotor 400A is applied to an induction motor 100A, and FIG. 12 is a cross-sectional view (view taken vertically to the axial center $O_1$) of the rotor 400A included in the motor 100A in FIG. 11. In FIGS. 11 and 12, parts similar to those in FIGS. 1 and 10 are denoted by similar numerals.

The motor 100A in FIGS. 11 and 12 differs from the motor 100 in FIGS. 1 and 10 in the rotor 400A, particularly a configuration of the rotor component member 300A. In other words, as illustrated in FIGS. 11 and 12, the motor 100A includes a rotor core 331, a plurality of conductor bars 332, and a pair of end rings 333 in place of the magnets 331 and the holding member 321.

The rotor core 331 is made of a laminate body in which a plurality of electromagnetic steel sheets is laminated one over another along the axial center $O_1$. The conductor bars 332 are arranged, for example, circumferentially at regular intervals and adjacent to an outer circumferential surface of the rotor core 331 along the axial center $O_1$ in the rotor core 331. The end rings 333 are arranged adjacent to both the front and rear end surfaces of the rotor core 331, connected to end portions of each conductor bar 332, and allow both ends of each conductor bar 332 to be electrically short-circuited.

In the above embodiments, the motor 100 is applied to the horizontal type machining center (FIG. 13), but may be similarly applied to a vertical machining center and the other machine tools, and the configuration of the machine tool is not limited to the above description. Further, in the above embodiments, examples in which the rotor component member 300 and the rotor 400 are applied to the motor for driving the main shaft of the machine tool are described, but the rotor component member and the rotor according to the present invention can be similarly applied not only to the motor for the machine tool but also to the other motors. Further, the rotor component member and the rotor according to the present invention can be similarly applied to rotating electrical machines other than the motor.

Effects of the Invention

According to the present invention, since at least one of the tapered surfaces of the corresponding rotor component member and rotating axis has a corrugated surface structure storing a lubricant, a friction force between the rotor component member and the rotating axis during press-fitting of the rotating axis relative to the rotor component member reduces so that the rotating axis can be easily press-fitted into the rotor component member. In addition, after press-fitting the rotating axis relative to the rotor component member, the surface structures of the corresponding tapered surfaces wear away so that a friction force between the rotor component member and the rotating axis increases, and a positional displacement of the rotor component member relative to the rotating axis during high-speed rotation of the rotor can be prevented.

The above description is merely an example, and the present invention is not limited to the above embodiments and modifications as long as they do not impair the features of the present invention. Constituent elements in the above embodiments and modifications include those that can be replaceable while maintaining the unity of the invention and obviously replaceable. In other words, other embodiments that are considered to fall within the scope of the technical idea of the present invention are also included within the range of the present invention. In addition, one or a plurality of the above embodiments and modifications can be optionally combined with each other.

What is claimed is:

1. A rotor comprising:
    a rotating axis rotating about an axial center of the rotating axis and including a tapered surface in an outer circumferential surface of the rotating axis; and
    a rotor component member fitted on the rotating axis using the tapered surface of the rotating axis, wherein the rotor component member comprises:
        a sleeve which has an inner circumferential surface including a tapered surface to be press-fitted relative to the tapered surface of the outer circumferential surface of the rotating axis; and
        a rotor component mounted on an outer circumferential surface of the sleeve,
        at least one of the tapered surface of the rotating axis and the tapered surface of the rotor component member has a corrugated surface structure created by chemical oxidation along the tapered surface, the corrugated surface stores a lubricant and the corrugated surface wears away when press-fitting the rotating axis relative to the rotor component member.

2. The rotor according to claim 1, wherein the rotating axis is made of an iron-based metal, and the tapered surface of the rotating axis is harder than the tapered surface of the rotor component member.

3. The rotor according to claim 2, wherein a layer where a plating or nitriding treatment is applied is provided on the tapered surface of the rotating axis.

4. The rotor according to claim 1, wherein the rotor component member further includes:
    a sleeve;
    a plurality of magnets arranged along an outer circumferential surface of the sleeve; and
    a cylindrical holding member surrounding the plurality of magnets, wherein the sleeve and the plurality of magnets are sandwiched between the rotating axis and the holding member by an elastic restoring force toward a radially inner side that is produced in the holding member.

5. The rotor according to claim 4, wherein the outer circumferential surface of the sleeve has a phosphoric acid-based oxidation coating.

6. A motor comprising the rotor according to claim 1.

7. A machine tool comprising the motor according to claim 6.

8. The rotor according to claim 1, wherein the surface structure has any one of a phosphoric acid based oxidation coating, a sulfuric acid based oxidation coating, a hydrochloric acid based oxidation coating, an oxalic acid based oxidation coating, and a chromic acid based oxidation coating.

9. The rotor according to claim 1, wherein the tapered surface of the rotor component member and the tapered surface of the rotating axis are in full contact with each other with a surface pressure and fixed to each other.

10. A method of manufacturing a rotor, the rotor comprising:
    a rotating axis rotating about an axial center of the rotating axis and including a tapered surface on an outer circumferential surface of the rotating axis; and a rotor component member fitted on the rotating axis using the tapered surface of the rotating axis, wherein, the rotor component member comprises a sleeve which has an inner circumferential surface including a tapered surface to be press-fitted relative to the tapered surface of the outer circumferential surface of the rotating axis, and a rotor component mounted on an outer circumferential surface of the sleeve, and
    at least one of the tapered surface of the rotating axis and the tapered surface of the rotor component member has a corrugated surface structure created by chemical oxidation along the tapered surface, the corrugated surface structure stores a lubricant and wears away when press-fitting the rotating axis relative to the rotor component member, the method comprising:
        storing a lubricant in the corrugated surface structure of at least one of the tapered surface of the rotating axis and the tapered surface of the rotor component member before press-fitting the rotating axis relative to the rotor component member; and
        wearing away by press-fitting the rotating axis relative to the rotor component member to discharge the lubricant.

* * * * *